United States Patent
Matsuto et al.

[19]

[11] Patent Number: 6,109,383
[45] Date of Patent: Aug. 29, 2000

[54] POWER UNIT FOR MOTORCYCLE

[75] Inventors: Takushi Matsuto; Kaoru Wachigai, both of Wako, Japan

[73] Assignee: Honda Giken Kogyo Kabushiki Kaisha, Tokyo, Japan

[21] Appl. No.: 09/152,107

[22] Filed: Sep. 14, 1998

[30] Foreign Application Priority Data

Sep. 14, 1997 [JP] Japan ................................ 9-268075

[51] Int. Cl.[7] ............................................. B62D 61/02
[52] U.S. Cl. ..................... 180/220; 180/226; 180/292; 180/230; 180/65.2; 180/65.5
[58] Field of Search .................. 180/218, 226, 180/220, 227, 228, 291, 292, 299, 230, 65.2, 65.3, 65.4, 65.5, 65.6

[56] References Cited

U.S. PATENT DOCUMENTS

| 4,388,979 | 6/1983 | Fritzenwenger | 180/226 |
|---|---|---|---|
| 4,607,718 | 8/1986 | Nagataki et al. | 180/226 |
| 4,830,134 | 5/1989 | Hashimoto | 180/219 |
| 5,094,315 | 3/1992 | Taki et al. | 180/219 |
| 5,433,286 | 7/1995 | Kumamaru et al. | 180/219 |

FOREIGN PATENT DOCUMENTS

| 517567 | 6/1920 | France | 180/226 |
|---|---|---|---|
| 144273 | 6/1990 | Japan | 180/226 |
| 175473 | 7/1996 | Japan . | |
| 8175477 | 7/1996 | Japan . | |
| 2265588 | 6/1993 | United Kingdom . | |

Primary Examiner—Paul N. Dickson
Assistant Examiner—Bryan Fischmann
Attorney, Agent, or Firm—Birch, Stewart, Kolasch & Birch, LLP

[57] ABSTRACT

To provide a power unit less affected by the length of the cylinder of an engine. A cam shaft drive mechanism is composed of a cam shaft drive pulley, a belt, a pair of cam shaft pulleys, and a tensioner disposed on the front surface of a power unit. Since the cylinder is disposed in the width direction of the vehicular body with its cylinder axis substantially in the horizontal direction (for example, a tilt angle α with respect to the ground is set at +10), the center of gravity of the vehicle is lowered and also the cylinder length can be set within the vehicular width. This increases the degree of design of the vehicle.

20 Claims, 8 Drawing Sheets

POWER UNIT FOR MOTORCYCLE

BACKGROUND OF THE INVENTION

1. Field of the Invention

The present invention relates to a power unit for a motorcycle, and particularly to a power unit suitable for a hybrid type motorcycle including an electric motor in addition to an engine.

2. Description of Related Art

Vehicles of the type using gasoline engines as a drive source are mainly available; however, vehicles of a type using an electric motor as a drive source are required at locations where occurrence of exhaust gas must be avoided. An electric motor-driven vehicle, however, is inconvenient, since it has increased body weight and shortened running distance. To cope with such an inconvenience, it has been increasingly required to develop a hybrid type vehicle including an electric motor in addition to an engine.

For example, Japanese Patent Laid-open No. Hei 8-175477 discloses a hybrid type motorcycle entitled "Device for switching Engine Power to/from Motor Power in Motorcycle or the Like".

As shown in FIG. 2 of the above document, an engine 10 is disposed in front of a rear wheel 37, with a cylinder of the engine 10 projecting forward or slightly obliquely forward.

According to the related art structure, as the cylinder of the engine becomes longer, the rear wheel 37 must be correspondingly shifted backward, to thereby extend the wheel base (distance between front and rear axles). The erection of the cylinder axis restricts space for a helmet containing box, e.g.

SUMMARY OF THE INVENTION

Accordingly, an object of the present invention is to provide a power unit less affected by the length of the cylinder of an engine.

To achieve the above object, according the present invention, there is provided a power unit for a motorcycle, including an engine disposed in front of a rear wheel such that a crank shaft extends in the longitudinal direction and a cylinder block of the engine is laterally adjacent to a front portion of the rear wheel. Furthermore, a power transmission system is disposed on one side of the rear wheel for transmitting power of the engine, the power unit being mounted to a main frame through a swing axis formed at a front portion of the power unit and swung together with the rear wheel. In addition, a valve drive mechanism is disposed on a front surface of the cylinder block and a primary drive gear for transmitting power of the engine to the power transmission system is disposed behind a cylinder axis.

With this configuration, since the cylinder is laid in the width direction of the vehicular body, the width of the cylinder becomes small in a side view of the vehicular body, to thereby decrease the wheel base. Furthermore, since the valve drive mechanism is positioned on the front surface of the power unit, it is possible to easily check and repair the mechanism. Since the primary drive gear is disposed on the rear wheel side, the cylinder axis is shifted forward and correspondingly the rear wall of the cylinder block is shifted forward. It is therefore possible to decrease the wheel base and ensure sufficient space for a helmet.

According to the present invention, a clutch shaft constituting part of the power transmission system is disposed in parallel with a crank shaft; a primary driven gear meshing with the primary drive gear is loosely fitted around the clutch shaft, the primary driven gear having a cylindrical member connected to a inner clutch of a centrifugal clutch disposed in front of the primary driven gear coaxially with the clutch shaft; an outer clutch of the centrifugal clutch is connected to the clutch shaft; and the cylindrical member is connected to an outer clutch of a one-way clutch for transmitting a rotational force of a starter motor.

With this configuration, it is possible to make effective use of a space on the front side of the primary driven gear on the clutch shaft of the power transmission system and hence to decrease the wheel base.

According to the present invention, a balance weight for primary balance of the crank shaft is integrally provided on the outer clutch of the one-way clutch for a starter.

Since the balance weight is disposed at a position nearly equal to the position of the crank shaft, it is possible to suppress the occurrence of a coupling moment of the balance weight, and since the balance weight is integrally provided on the outer clutch of the one-way clutch for a starter, it is possible to reduce the number of parts and to make the power unit compact.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
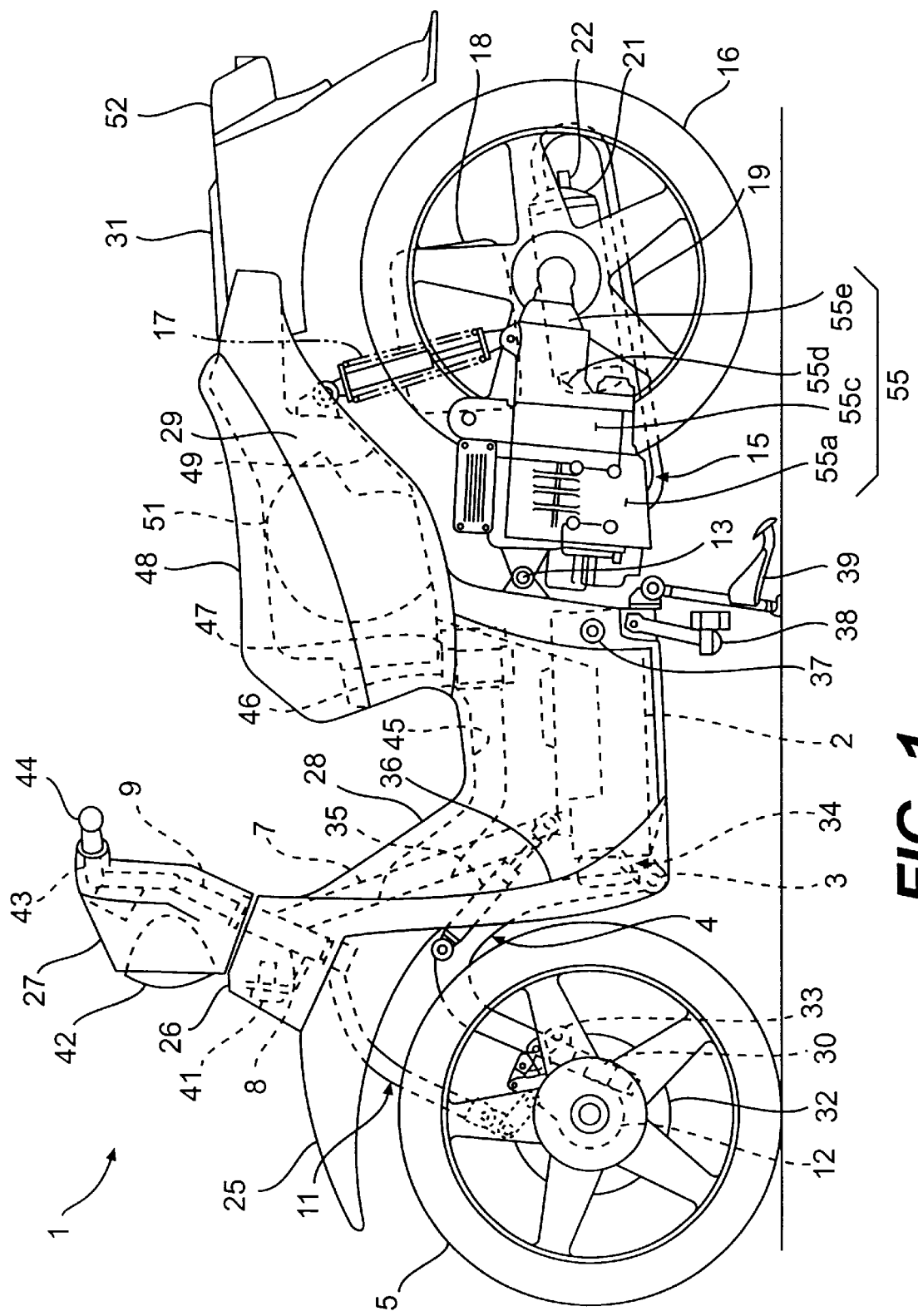
FIG. 1 is a side view of a motorcycle according to the present invention.

Hereinafter, an embodiment of the present invention will be described with reference to the accompanying drawings. It is to be noted that the drawings should be viewed in the direction of the reference numerals.

FIG. 1 is a side view of a motorcycle according to the present invention. Referring to FIG. 1, a motorcycle 1 has at its lower central portion a box-like main frame 2 serving as a battery containing box. Inverse U-shaped front swing arms 4 extend from a lower front portion of the main frame 2 through a front pivot 3, and a front wheel 5 is rotatably mounted on the front swing arms 4. A head pipe post 7 extends obliquely upward from an upper front portion of the main frame 2 and a head pipe 8 is fixed at a leading end of the head pipe post 7. A handle post 9 is rotatably mounted in the head pipe 8, and a steering arm 11 is mounted on a lower end of the handle post 9. A leading end (lower end) of the steering arm 11 is connected to a knuckle 12 mounted on the front wheel 5. A power unit 15 is swingably mounted on an upper rear portion of the main frame 2 through a rear pivot 13 functioning as a swing shaft. A rear wheel 16 is mounted on the power unit 15. A rear cushion 17 is disposed in front of the rear wheel 16, and an air cleaner 18, an exhaust pipe 19, a muffler 21, and a tail lamp 22 are disposed behind the rear wheel 16. A vehicular body is surrounded by a front fender 25, a front cover 26, a front handle cover 27, a center cowl 28, a rear cowl 29 and a rear fender 31 which are disposed in this order from the front side to the rear side of the vehicular body.

In FIG. 1, reference numeral 30 indicates a stem; 32 is a front brake disk; 33 is a caliper; 34 is a resin spring; 35 is a front damper; 36 is a leg shield; 37 is a passenger's step; 38 is a side stand; and 39 is a main stand. On an upper side of FIG. 1, reference numeral 41 indicates a horn; 42 is a front lamp; 43 is a handlebar; 44 is a grip; 45 is a baffle duct; 46 is a radiator; 47 is a fan; 48 is a sheet; 49 is a helmet box; 51 is a helmet; 52 is a tail lamp; and 55 is a power unit case.

The power unit case 55 is composed of right and left crank cases 55b and 55a (the right crank case 55b on the back side of the figure is not shown), a transmission case 55c, an electric motor case 55d, and a reduction gear case 55e.

Figure 2:
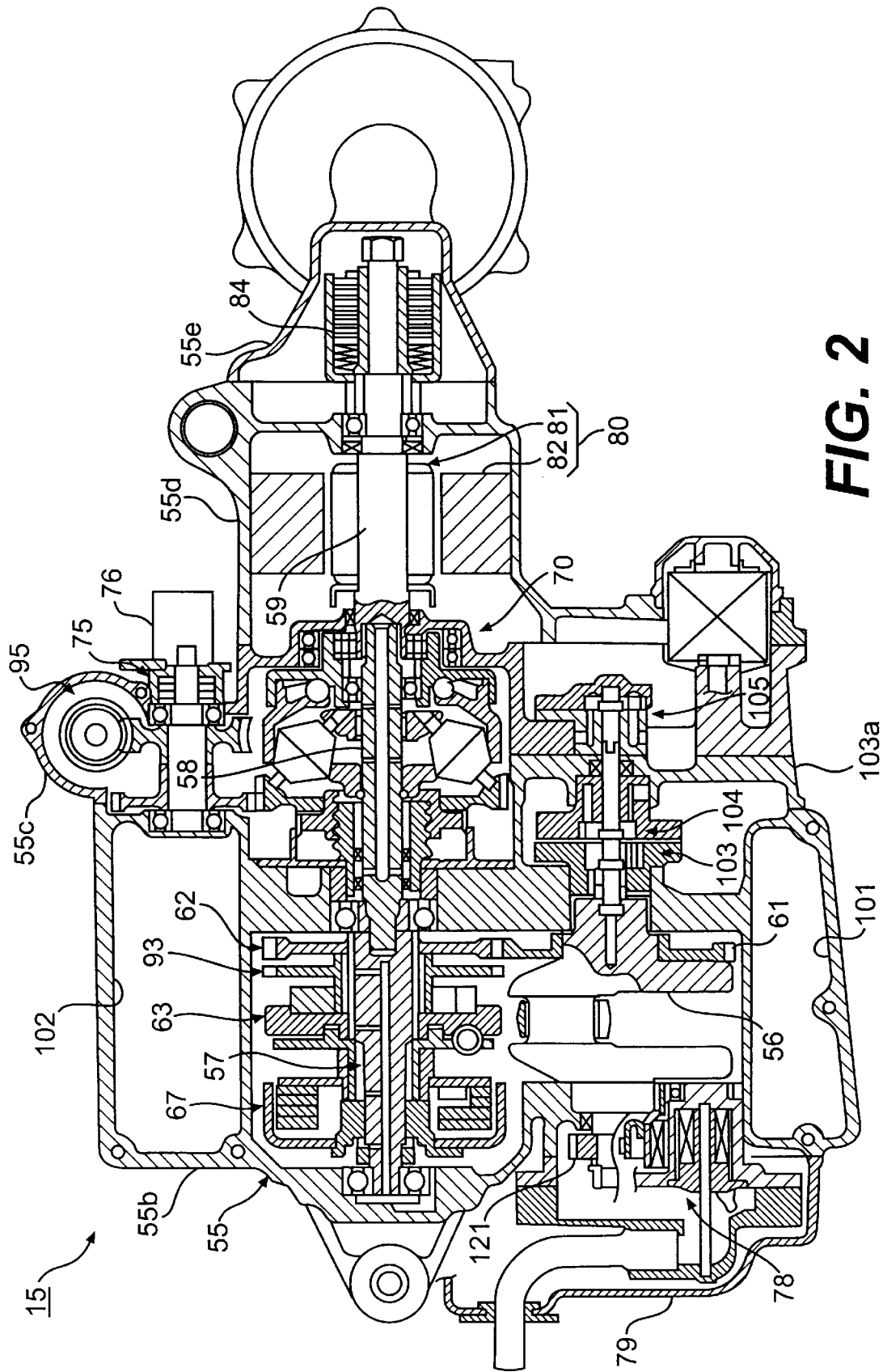
FIG. 2 is a sectional side view of a power unit according to the present invention.

FIG. 2 is a sectional side view of the power unit according to the present invention.

As will be fully described with reference to FIG. 8, the power unit 15 includes a four-cycle engine in which an intake cam shaft and an exhaust cam shaft are provided in a cylinder head. The power unit 15 has a crank shaft 56 disposed in a lower portion of the power unit case 55; a clutch shaft 57 disposed in parallel to and higher than the crank shaft 56; and a transmission shaft 58 and an electric motor shaft 59 disposed in such a manner as to extend from one end of the clutch shaft 57 in the longitudinal direction (fore and aft) of the vehicular body. That is to say, the clutch shaft 57, transmission shaft 58, and electric motor shaft 59 are disposed in series and also in parallel to and higher than the crank shaft 56.

Since the clutch shaft 57, transmission shaft 58, and electric motor shaft 59 are disposed in series in the longitudinal direction of the vehicular body, the direction of a force applied to the power unit case 55 becomes simple. This facilitates the design of the power unit case 55. Concretely, the power unit case 55 can be designed such that the rigidity is high in the direction where the force is applied and the rigidity is low in the direction where the force is not applied; and consequently, the power unit case 55 can be reduced in weight and also be made compact as a whole in proportion to simplification of the force applied to the power unit case 55.

In FIG. 2, reference numeral 75 indicates an epicycle reduction gear; 76 is a potentiometer for detecting a rotational angle of a transmission control motor 95 to be described later; 121 is a cam shaft drive pulley; 78 is a water pump driven by the pulley 121; 79 is a belt cover; and 103a is an oil pump case disposed at a lower central portion of the figure.

A primary drive gear 61, a primary driven gear 62, a centrifugal clutch 67, and a transmission 70, (which are further added with an electric motor shaft 59 when the electric motor 80 is operated for assisting the engine power), constitute a power transmission system for transmitting power from the engine. The electric motor shaft 59 when the electric motor 80 is operated constitutes a power transmission system for transmitting power from the electric motor.

The details of components associated with the clutch shaft 57, transmission shaft 58, and electric motor shaft 59 will be fully described with reference to the following figure.

Figure 3:
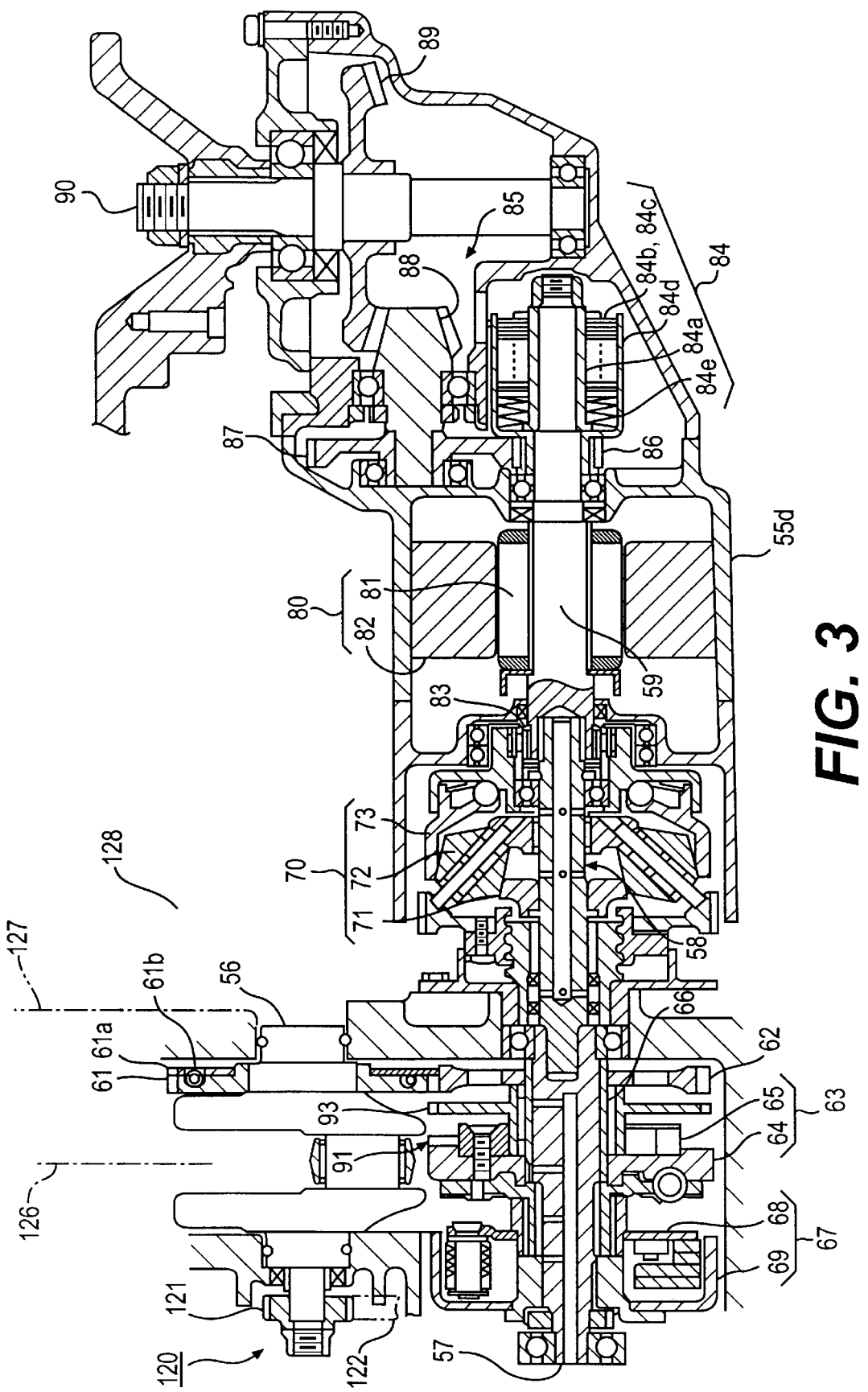
FIG. 3 is a sectional plan view of the power unit according to the present invention.

FIG. 3 is a sectional plan view of the power unit according to the present invention. The details of the components associated with the clutch shaft, transmission shaft, and electric motor shaft, and the drive force transmission configuration will be described with reference to this figure.

The primary driven gear 62 rotatably mounted on the clutch shaft 57 is driven by the primary drive gear 61 mounted on the crank shaft 56. The primary driven gear 62 drives an outer clutch 64 of a one-way clutch 63 for a starter and an inner clutch 68 of the centrifugal clutch 67 independently from the clutch shaft 57. For this purpose, the primary driven gear 62 is connectable to both the outer clutch 64 of the one-way clutch 63 and the inner clutch 68 of the centrifugal clutch 67 by means of a cylindrical member 66. As the centrifugal inner clutch 68 is rotated at a rotational speed of a specific value or more, a centrifugal outer clutch 69 is rotated together with the centrifugal inner clutch 68, resulting in the clutch shaft 57 being rotated.

The above primary drive gear 61 includes a phase difference adjusting sub-gear 61a and a spring 61b for preventing occurrence of gear rattle.

The transmission 70, which is of a cone type with its function fully described with reference to another figure, transmits power from the transmission shaft 58 to an inner disk 71 to a cone 72 and then to an outer cup 73. The rotation of the outer cup 73 is transmitted to the electric motor shaft 59 through a one-way clutch 83.

The electric motor 80 is of a careless type, in which a permanent magnet type rotor 81 is mounted on the electric motor shaft 59 and a stator coil 82 is mounted on an electric motor case 55d.

When the centrifugal clutch 67 is turned on, a drive force is transmitted in the order of the clutch shaft 57, transmission shaft 58, transmission 70, and electric motor shaft 59, and acts to drive an axle 90 through a multi-disk type torque limiter 84 and a reduction gear mechanism 85 (which is composed of a small gear 86, a large gear 87, a small gear 88, and a large gear 89).

The multi-disk type torque limiter 84 includes a inner limiter 84a rotated together with the electric motor shaft 59, disks 84b and 84c (the disk 84b is mounted on the inner limiter 84a and the disk 84c is mounted on the following outer limiter 84d), an outer limiter 84d, and a spring 84e. The small gear 86 is integrated with the outer limiter 84d.

Power is transmitted from the inner limiter 84 to the disk 84b to the disk 84c to the outer limiter 84d and to the small gear 86. If excess torque over a predetermined value is applied, there occurs a slip between the disks 84b and 84c for protecting the components of the multi-disk torque limiter 84. The predetermined torque can be set by the spring 84e.

The one-way outer clutch 64 for a starter acts as a flywheel and has a balance weight 91 for balancing the engine. The one-way outer clutch 64 constitutes the oneway clutch 63 for transmitting rotation of a starter in combination with the one-way inner clutch 65.

When a starter driven gear 93 is rotated by a starter (not shown), the centrifugal inner clutch 68 is rotated through the one-way inner clutch 65 and the one-way outer clutch 64, to start operation of the engine. When the one-way outer clutch 64 is rotated at a higher speed, it is separated from the inner clutch 65 on the low speed side.

In FIG. 3, the cam shaft drive pulley 121 for driving a cam shaft or the like is provided on the other end (front end) of the crank shaft 56. A belt 122 is driven by the pulley 121. The details of the pulley 121 and the belt 122 will be fully described later.

Figure 4:
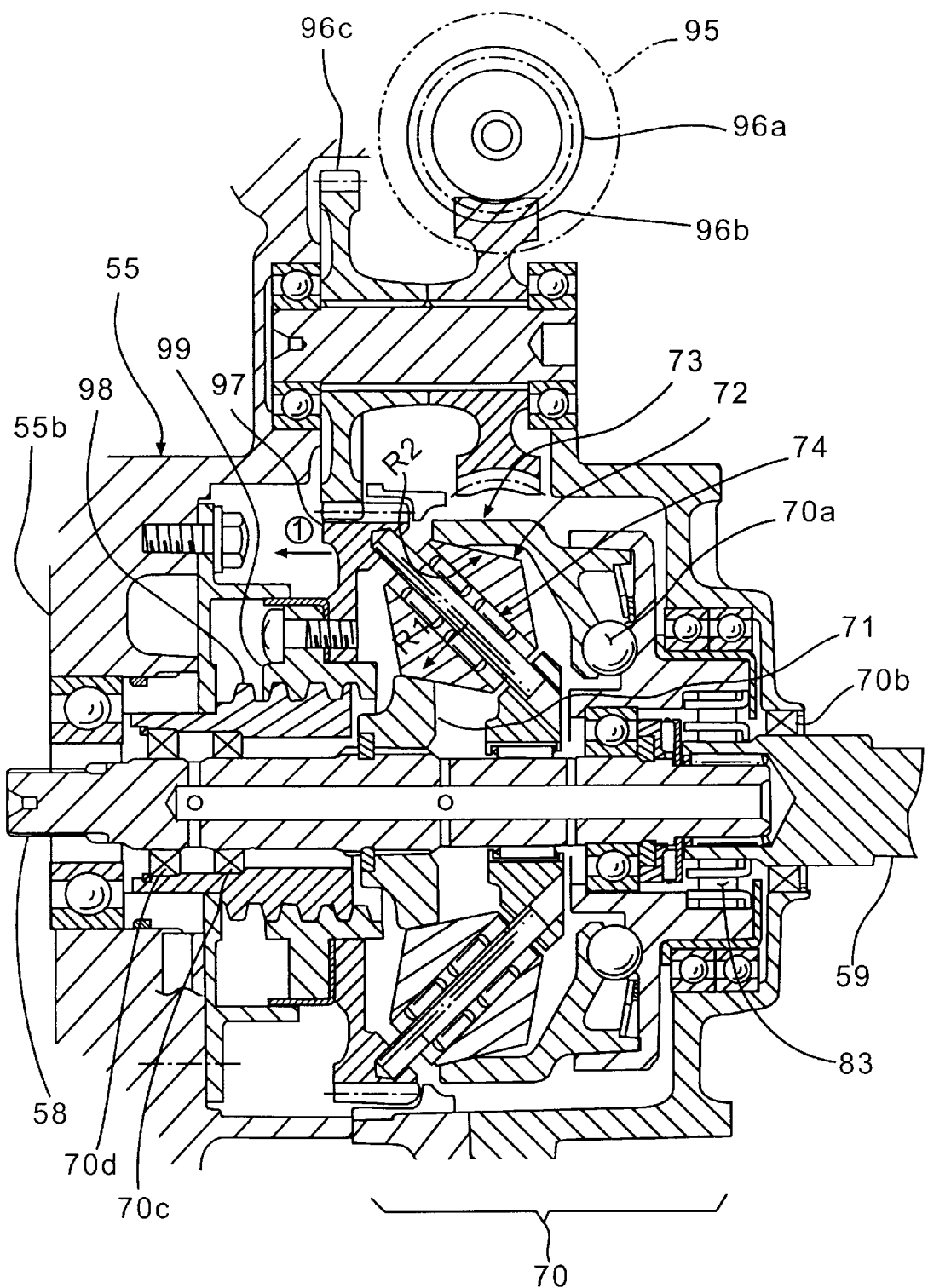
FIG. 4 is a view showing a cone type continuously variable transmission according to the present invention.
Figure 5:
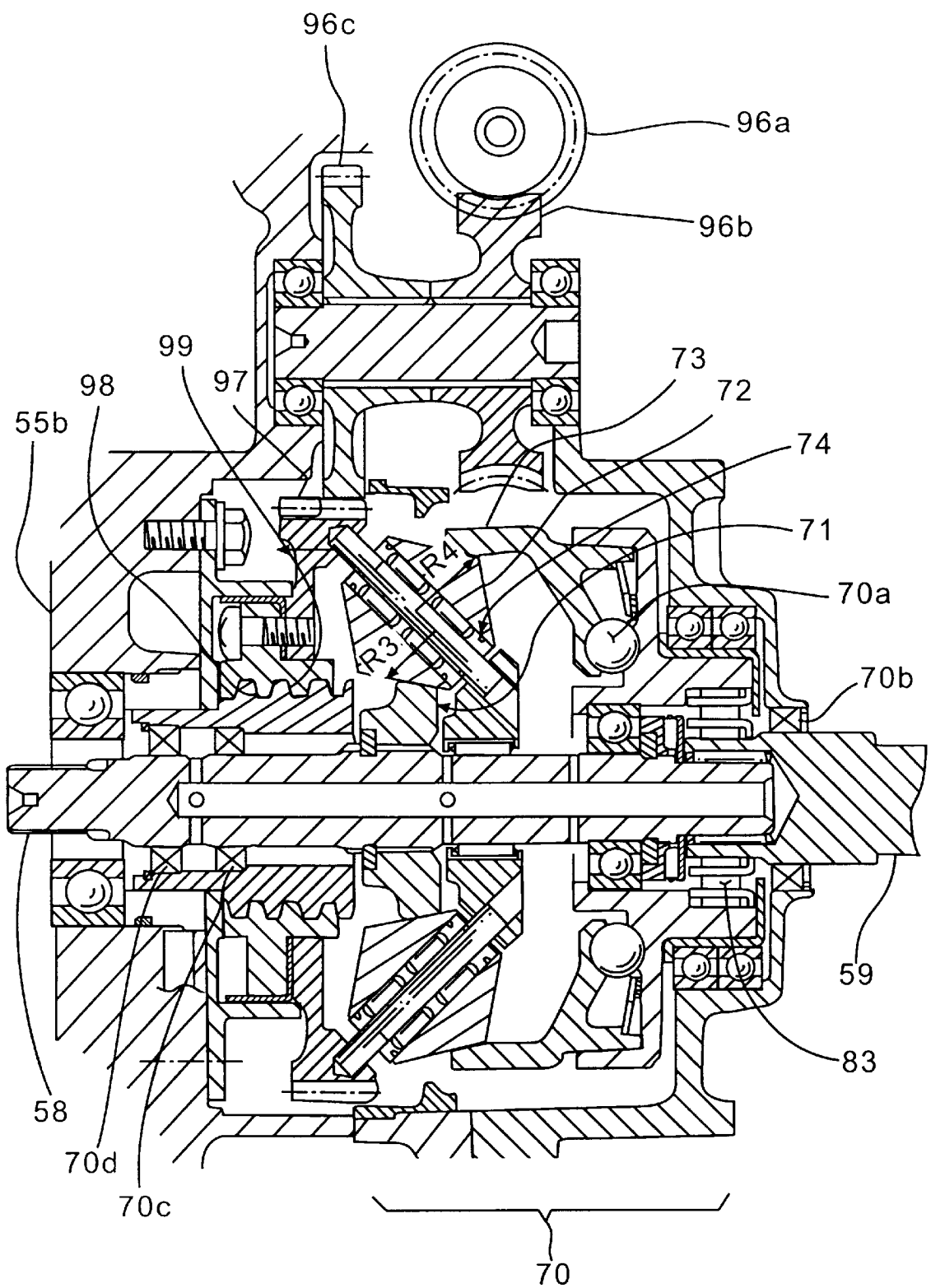
FIG. 5 is a view showing a the cone type continuously variable transmission according to the present invention.

FIGS. 4 and 5 are views illustrating of the cone type continuously variable transmission according to the present invention.

In the state of the cone 72 shown in FIG. 4, a relationship of R1>R2 is given, where R1 is a distance from the center of a cone supporting shaft 74 to the inner disk 71, that is, a rotational radius of the inner disk 71 and R2 is a distance from the center of a cone supporting shaft 74 to the outer cup 73, that is, a rotational radius of the outer cup 73.

The cone 72 is rotated at a low speed because a large diameter portion (radius: R1) of the cone 72 is rotated by the inner disk 71, and the outer cup 73 is rotated at a low speed because the outer cup 73 is rotated by the small diameter portion (radius: R2) of the cone 72.

When rotation of the outer cup 73 is higher than that of the electric motor shaft 59, power is transmitted from the outer cup 73 to the electric motor shaft 59 through the one-way clutch 83.

Reference numeral 70a indicates a cam ball for pushing the outer cup 73 leftward along with rotation of the outer cup 73. Such a pushing action allows contact pressure to be applied between the outer cup 73 and the cone 72.

Reference numerals 70b, 70c and 70d indicate oil seals. The oil seals 70b and 70c form a closed space for accumulating transmission oil in the transmission 70, and the oil seal 70d cuts off oil on the crank case 55b side (on the left side of the figure). Accordingly, there is no fear of oil in the crank case mixing with transmission oil.

In the state of the cone 72 shown in FIG. 5, a relationship of R3<R4 is given, where R3 is a distance from the center of the cone supporting shaft 74 to the inner disk 71, that is, a rotational radius of the inner disk 71, and R4 is a distance from the cone supporting shaft 74 to the outer cup 73, that is, a rotational radius of the outer cup 73.

The cone 72 is rotated at a high speed because the small diameter portion (radius: R3) of the cone 72 is rotated by the inner disk 71, and the outer cup 73 is rotated at a high speed because the outer cup 73 is rotated by the large diameter portion (radius: R4) of the cone 72.

By moving the cone 72 as shown in FIGS. 4 and 5, the transmission 70 transmits rotation at a reduced speed, a uniform speed, or an increased speed.

For this purpose, as shown in FIG. 4, a control gear 97 is shifted by the transmission control motor 95 through gears 96a, 96b and 96c. The control gear 97 has a trapezoid female thread portion 99 formed on its boss portion. The trapezoid female thread portion 99 is meshed with a trapezoid male thread portion 98 fixed on the case 55 side. The control gear 97 is shifted leftward in the figure by spiral motion of the trapezoid female thread portion 99. The leftward shift of the control gear 97 moves the cone 72 leftward in the figure together with the cone supporting shaft 74 into the state shown in FIG. 5.

It is important that both the trapezoid male thread portion 98 and the trapezoid female thread portion 99 are provided on the inner disk 71 side, rather than the outer cup 73 side. The cone 72 is pushed leftward in the figure by reaction of the outer cup 73. As a result, the control gear 97 is applied with a force in the direction shown by an arrow "①", that is, in the direction from the low speed side to the high speed side. With the configuration in this embodiment, the cone 72 can be shifted to the high speed side with a small torque. This is effective to lower the necessary capacity of the transmission control motor 95.

Figure 6:
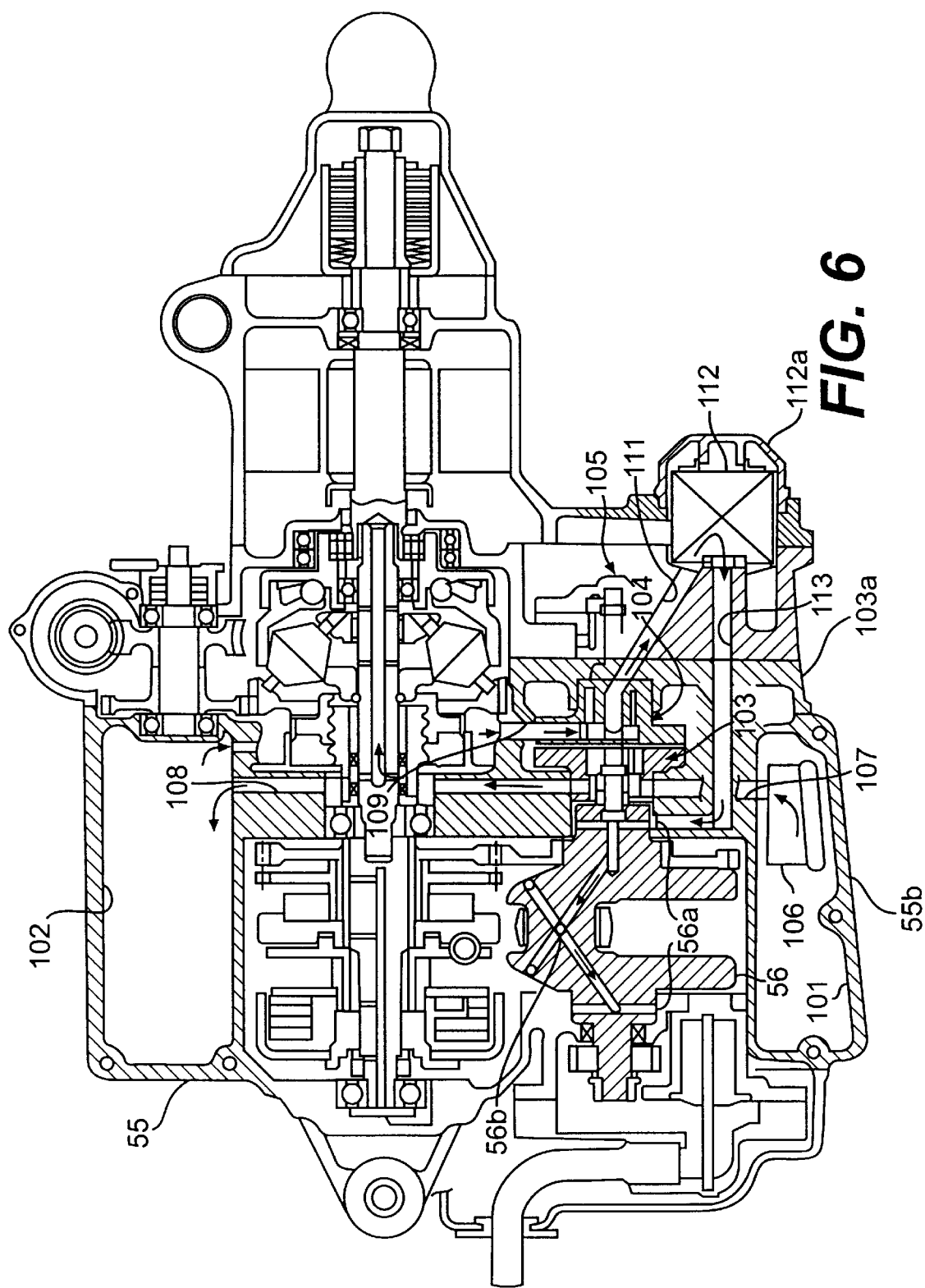
FIG. 6 is a view illustrating an engine lubricating system according to the present invention.

A lubricating system according to the present invention will now be described below. FIG. 6 is a view illustrating an engine lubricating system according to the present invention, in which flow of oil is indicated by an arrow.

The power unit case 55 has a lower oil tank 101 disposed at its lower portion, and an upper oil tank 102 disposed at its upper portion. A first oil pump 103, a second oil pump 104, and a third oil pump 105 are coaxially disposed on one end side (right end side) of the crank shaft 56. First, oil in the lower oil tank 101 is pumped by the first oil pump 103 through a strainer 106 and a first oil passage 107, and is supplied to the upper oil tank 102 through a second oil passage 108.

The oil in the upper oil tank 102 flows to the second oil pump 104 through a third oil passage 109 and is pressurized by the second oil pump 104. The oil thus pressurized lubricates main journal portions 56a, a connecting rod large end portion 56b, and others ( particularly, a valve chamber not shown) through a fourth oil passage 111, a filter 112, and a fifth oil passage 113, and returns to the lower oil tank 101. In this figure, reference numeral 112a indicates a filter cover.

Figure 7:
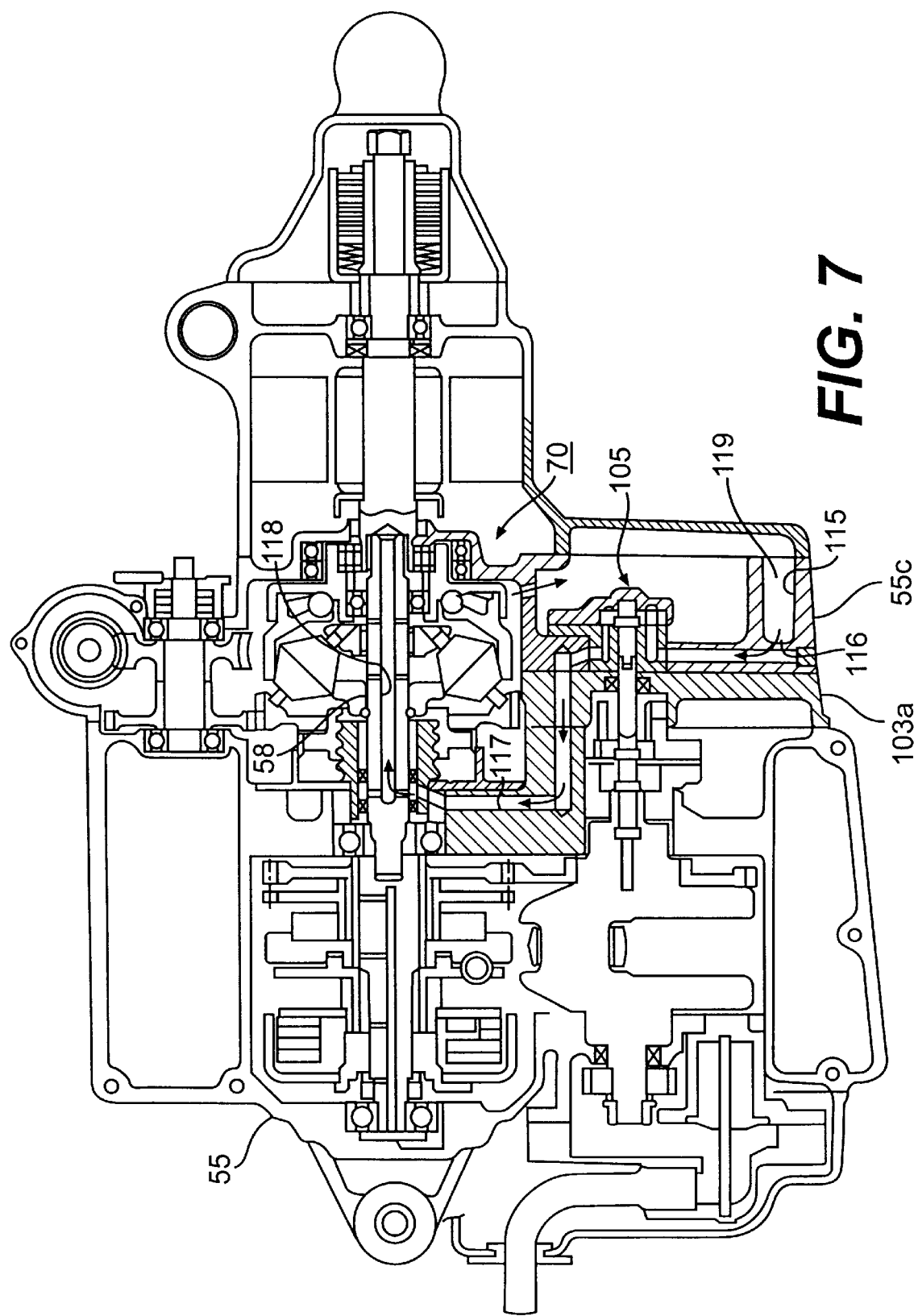
FIG. 7 is a view illustrating a transmission lubricating system according to the present invention.

FIG. 7 is a view illustrating a transmission lubricating system according to the present invention. Referring to FIG. 7, transmission oil is pumped from a transmission oil tank 115 additionally provided on a lower portion of the power unit case 55 by the third oil pump 105 through a sixth oil passage 116, being fed to the transmission shaft 58 through a seventh oil passage 117, and is supplied to the transmission 70 through an oil passage 118 in the transmission shaft 58. The oil is then returned to the transmission oil tank 115 in the direction shown by an arrow in the figure, and is pumped by the third oil pump 105 through a strainer 119.

Figure 8:
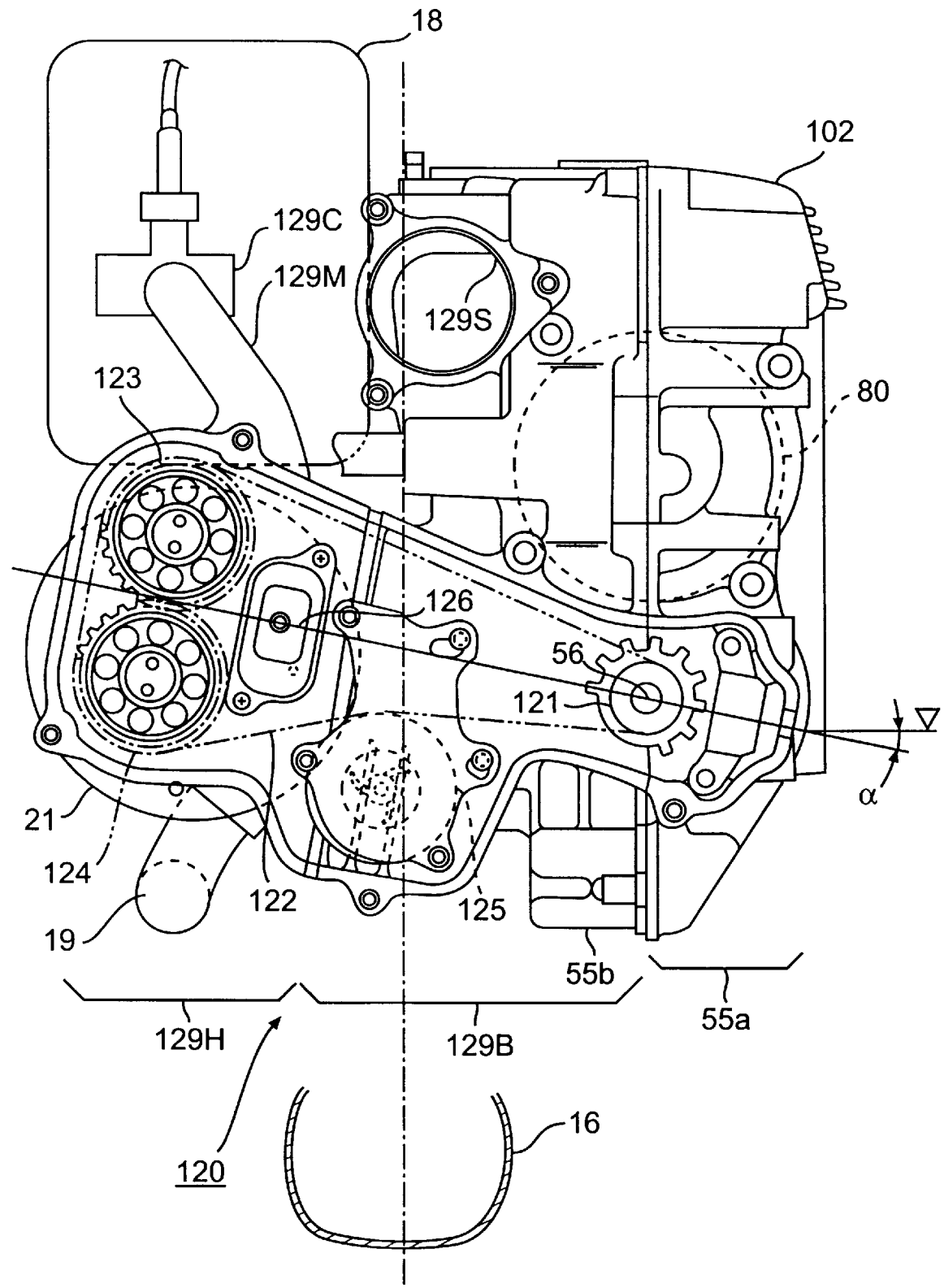
FIG. 8 is a front view of the power unit, showing a cam shaft drive mechanism as a valve drive mechanism according to the present invention.

FIG. 8 is a front view of the power unit, showing a cam shaft drive mechanism as a valve drive mechanism according to the present invention.

Referring to FIG. 8, the left crank case 55a is mounted on the right side of a cylinder block 129B integrated with the right crank case 55b, and the electric motor 80 is disposed higher than the crank shaft 56. A cylinder head 129H is mounted on the left side of the cylinder block 129B. The muffler 21 is mounted at the leading end of the exhaust pipe 19 extending from the cylinder head 129H. An intake manifold 129M extending from the air cleaner 18 on the upper left side (and on the back side of the figure) is connected to the cylinder head 129H through a carburetor 129C. Reference numeral 129S indicates a starter motor mounting hole.

In FIG. 8, since a belt cover 79 is removed, there can be seen, from the front side of the power unit 15, a cam shaft drive mechanism 120 as the valve drive mechanism composed of a cam shaft drive pulley 121, a belt 122, an intake side cam shaft pulley 123, an exhaust side cam shaft pulley 124, and a tensioner 125.

As is apparent from FIG. 8, since the cylinder is disposed in the width direction of the vehicular body with its cylinder axis 126 substantially in the horizontal direction (for example, a tilt angle α with respect to the ground is set at +10), the center of gravity of the vehicle is lowered and also the cylinder length can be set within the vehicular width. This increases the degree of design of the vehicle.

As shown in FIG. 3, the cam shaft drive mechanism 120 can be easily checked and repaired from the front side separated from the rear wheel.

Since the primary drive gear 61 is disposed on the rear wheel side, the cylinder axis 126 is moved forward and correspondingly the rear wall 127 of the cylinder block is moved forward, to thereby keep the wheel base and ensure a sufficient helmet containing space. Further, an oil cooling fin is provided on the upper portion of the left crank case 55a at a position corresponding to the upper oil tank 102 on the outer side of the vehicular body.

The power unit 15 in this embodiment includes the electric motor 80 in addition to the engine. The crank shaft 56 and the electric motor shaft 59 are disposed in the longitudinal direction (fore and aft) of the vehicular body. Therefore, it is possible to facilitate the layout of the equipment.

The present invention can be also applied to a motorcycle using a gasoline engine as a drive source.

The present invention having the above configuration exhibits the following effects:

According to the present invention, since the cylinder is laid in the width direction of the vehicular body, the width of the cylinder becomes small in a side view of the vehicular body, to thereby keep the wheel base. Further, since the valve drive mechanism is positioned on the front surface of the power unit, it is possible to easily check and repair the mechanism. Since the primary drive gear is disposed on the rear wheel side, the cylinder axis is shifted forward and correspondingly the rear wall of the cylinder block is shifted forward, it is possible to keep the wheel base more advantageously and to sufficiently ensure a helmet containing space.

According to the present invention, it is possible to make effective use of a space on the front side of the primary driven gear on the clutch shaft of the power transmission system and hence to keep the wheel base more advantageously.

According to the present invention, since the balance weight is disposed at a position nearly equal to the position of the crank shaft, it is possible to suppress occurrence of a coupling moment of the balance weight. Furthermore, since the balance weight is integrally provided on the outer clutch of the one-way clutch for a starter, it is possible to reduce the number of parts and to make the power unit compact.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A power unit for a motorcycle, comprising:
   an engine positionable in front of a rear wheel of the motorcycle such that a crank shaft extends in a longitudinal direction and a cylinder block of the engine is laterally adjacent to a front portion of the rear wheel, the cylinder block having at least one cylinder positionable in a width direction of the motorcycle, said at least one cylinder having a cylinder axis oriented in a substantially horizontal direction;
   a power transmission system positionable on one side of the rear wheel for transmitting power of the engine;
   the power unit being mountable to a main frame of the motorcycle through a swing axis formed at a front portion of the power unit, the power unit swingable together with the rear wheel;
   a valve drive mechanism disposed on a front surface of the cylinder block; and
   a primary drive gear for transmitting power of the engine to said power transmission system is disposed behind the cylinder axis.

2. The power unit for a motorcycle according to claim 1, wherein said power transmission system further comprises:
   a clutch shaft disposed in parallel with the crank shaft;
   a primary driven gear meshing with said primary drive gear and loosely fitted around said clutch shaft, said primary driven gear including a cylindrical member;
   a centrifugal clutch including an inner clutch connected to the cylindrical member of said primary driven gear, said centrifugal clutch being disposed in front of said primary driven gear and coaxial with said clutch shaft, said centrifugal clutch further including an outer clutch connected to said clutch shaft; and
   a one-way clutch including an outer clutch connected to said cylindrical member of said primary driven gear for transmitting a rotational force of a starter motor.

3. The power unit for a motorcycle according to claim 2, wherein a balance weight for primary balance of aid crank shaft is integrally provided on said outer clutch of said one-way clutch for a starter.

4. The power unit for a motorcycle according to claim 1, wherein the power transmission system is connected to an axle of the rear wheel of the motorcycle for transmitting power from the engine to the rear wheel.

5. The power unit for a motorcycle according to claim 2, further comprising:
   an electric motor; and
   an electric motor shaft for transmitting power from the electric motor to the rear wheel.

6. The power unit for a motorcycle according to claim 5, wherein the transmission system includes a transmission shaft, the transmission shaft being coaxial with the clutch shaft and the electric motor shaft.

7. A power unit for a vehicle, comprising:
   an engine including a crank shaft extending in a longitudinal direction, a cylinder block of the engine positionable laterally adjacent to a front portion of a rear wheel of the vehicle, the cylinder block having at least one cylinder positionable in a width direction of the vehicle, said at least one cylinder having a cylinder axis oriented in a substantially horizontal direction;
   a power transmission system extending rearwardly from the engine on one side of the rear wheel for transmitting power of the engine;
   a valve drive mechanism disposed on a front surface of the cylinder block; and
   a primary drive gear for transmitting power of the engine to said power transmission system is disposed behind the cylinder axis.

8. The power unit for a vehicle according to claim 7, wherein said power transmission system further comprises:
   a clutch shaft disposed in parallel with the crank shaft;
   a primary driven gear meshing with said primary drive gear and loosely fitted around said clutch shaft, said primary driven gear including a cylindrical member;

a centrifugal clutch including an inner clutch connected to the cylindrical member of said primary driven gear, said centrifugal clutch being disposed in front of said primary driven gear and coaxial with said clutch shaft, said centrifugal clutch further including an outer clutch connected to said clutch shaft; and a one-way clutch including an outer clutch connected to said cylindrical member of said primary driven gear for transmitting a rotational force of a starter motor.

9. The power unit for a vehicle according to claim 8, wherein a balance weight for primary balance of said crank shaft is integrally provided on said outer clutch of said one-way clutch for a starter.

10. The power unit for a vehicle according to claim 7, wherein the power transmission system is connected to an axle of the rear wheel of the vehicle for transmitting power from the engine to the rear wheel.

11. The power unit for a vehicle according to claim 8, further comprising:

an electric motor; and an electric motor shaft for transmitting power from the electric motor to the rear wheel.

12. The power unit for a vehicle according to claim 11, wherein the transmission system includes a transmission shaft, the transmission shaft being coaxial with the clutch shaft and the electric motor shaft.

13. The power unit for a vehicle according to claim 7, wherein the power unit is mounted to a main frame of the vehicle through a swing axis, the power unit and the rear wheel being swingable about the swing axis.

14. The power unit for a vehicle according to claim 7, wherein the vehicle is a motorcycle.

15. A motorcycle comprising:

a frame;

front and rear wheels mounted to said frame;

a power unit including an engine having a crank shaft extending in a longitudinal direction, a cylinder block of the engine being laterally adjacent to a front portion of the rear wheel, the cylinder block having at least one cylinder disposed in a width direction of the motorcycle, said at least one cylinder having a cylinder axis oriented in a substantially horizontal direction;

a power transmission system extending rearwardly from the engine on one side of the rear wheel for transmitting power of the engine;

a valve drive mechanism disposed on a front surface of the cylinder block; and a primary drive gear for transmitting power of the engine to said power transmission system is disposed behind the cylinder axis.

16. The motorcycle according to claim 15, wherein said power transmission system further comprises:

a clutch shaft disposed in parallel with the crank shaft;

a primary driven gear meshing with said primary drive gear and loosely fitted around said clutch shaft, said primary driven gear including a cylindrical member;

a centrifugal clutch including an inner clutch connected to the cylindrical member of said primary driven gear, said centrifugal clutch being disposed in front of said primary driven gear and coaxial with said clutch shaft, said centrifugal clutch further including an outer clutch connected to said clutch shaft; and a one-way clutch including an outer clutch connected to said cylindrical member of said primary driven gear for transmitting a rotational force of a starter motor.

17. The motorcycle according to claim 16, wherein a balance weight for primary balance of said crank shaft is integrally provided on said outer clutch of said one-way clutch for a starter.

18. The motorcycle according to claim 15, wherein the power transmission system is connected to an axle of the rear wheel for transmitting power from the engine to the rear wheel.

19. The motorcycle according to claim 16, further comprising:

an electric motor; and an electric motor shaft for transmitting power from the electric motor to the rear wheel.

20. The motorcycle according to claim 19, wherein the transmission system includes a transmission shaft, the transmission shaft being coaxial with the clutch shaft and the electric motor shaft.

* * * * *